UNITED STATES PATENT OFFICE.

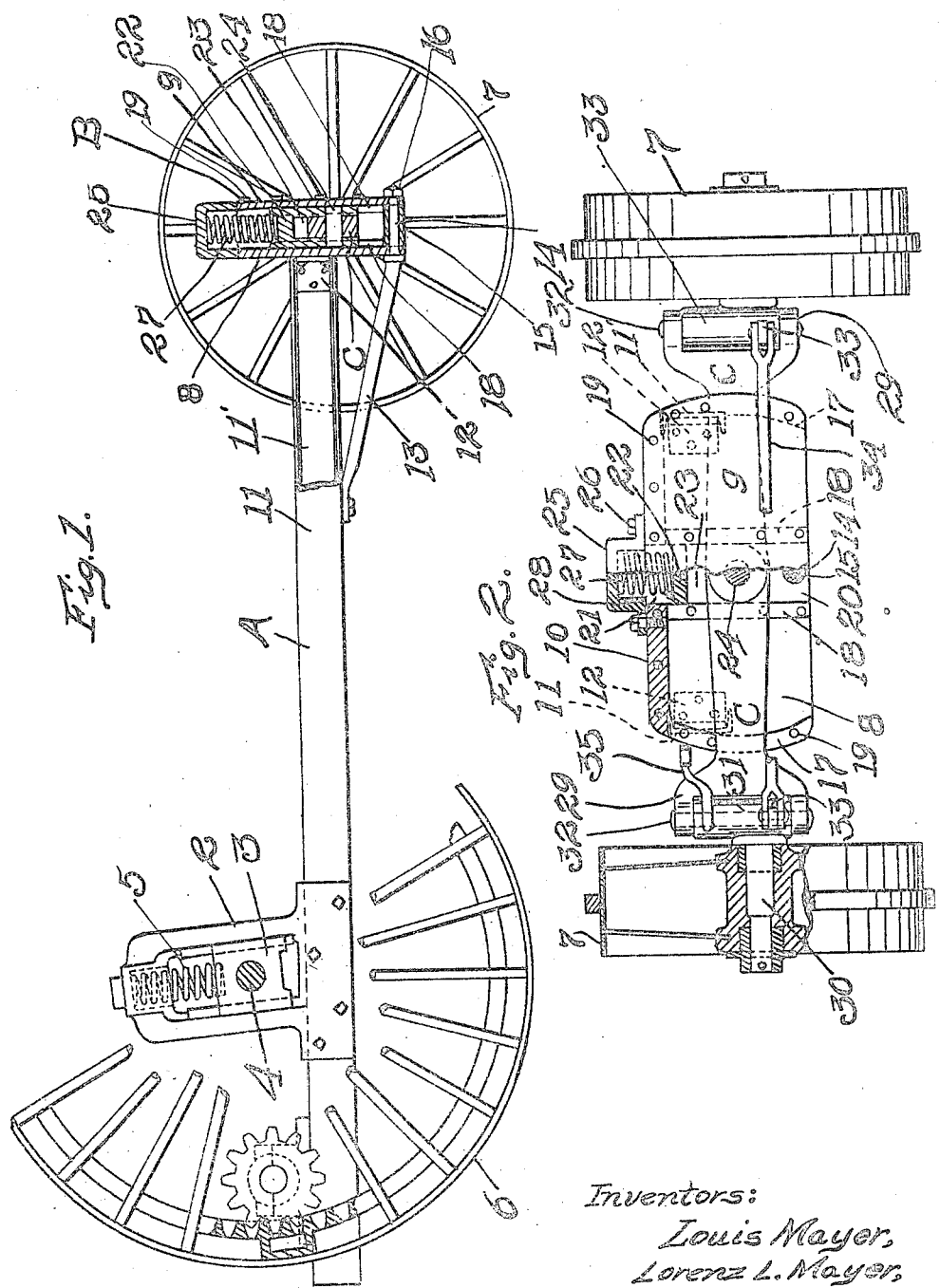

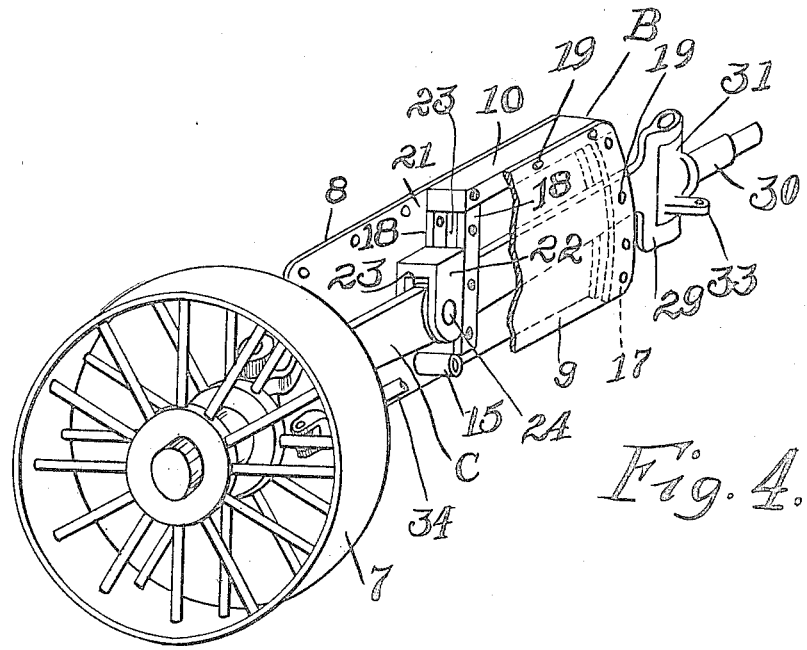
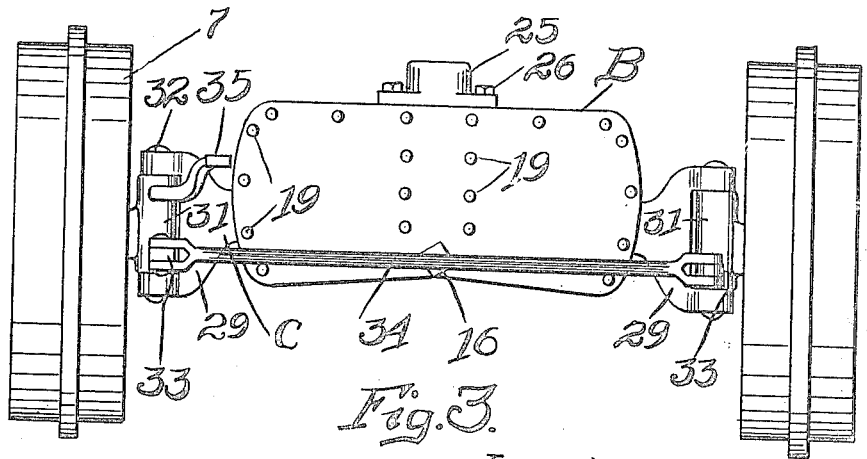

LOUIS MAYER, LORENZ L. MAYER, AND EDWIN A. BYE, OF MANKATO, MINNESOTA, ASSIGNORS TO MAYER BROTHERS COMPANY, OF MANKATO, MINNESOTA, A CORPORATION OF MINNESOTA.

AXLE-MOUNT FOR TRACTORS.

1,253,673.   Specification of Letters Patent.   Patented Jan. 8, 1918.

Application filed December 12, 1913, Serial No. 806,231. Renewed May 28, 1917. Serial No. 171,571.

*To all whom it may concern:*

Be it known that we, LOUIS MAYER, LORENZ L. MAYER, and EDWIN A. BYE, citizens of the United States, residing at Mankato, in the county of Blue Earth and State of Minnesota, have invented new and useful Improvements in Axle-Mounts for Tractors, of which the following is a specification.

The object of our invention is the production of improved means for mounting the forward end of a tractor frame whereby the front tractor wheels are free to move over inequalities in a road without excessively jolting the main frame and straining any of the parts. A further object is the production of a strong and durable construction which is adapted to resiliently support the forward end of the tractor frame and permitting the steering of the tractor wheels easily and readily irrespective of the angle or position at which the main frame rests. This invention further provides an efficient and inexpensive front axle mount or fifth wheel construction of such character that the front axle may be capable of free oscillation vertically and on a pivot in a vertical plane, thus permitting a free vertical movement of the vehicle with relation to the axle. Its construction also reinforces the strength of the frame.

The invention further contemplates novel features, parts and combinations of the same as will be described hereinafter and pointed out in the claims.

In the accompanying drawings forming part of this specification, Figure 1 is a side elevation partly in section of a tractor frame constructed in accordance with our invention, one of the tractor and one of the supporting wheels being removed; Fig. 2 is a front elevation partly broken away and in section looking at the front end of the construction illustrated in Fig. 1; Fig. 3 is a front elevation and Fig. 4 is a perspective of the front axle with one of the tractor wheels mounted thereon and a portion of the tractor frame connected thereto.

In the drawings A indicates the main frame of a tractor to which our invention is shown applied, said frame carrying on its rear end suitable supports such as 2 in which bearings such as 3 carrying the rear axle 4 are mounted to slide up and down, springs such as 5 being interposed between the upper ends of the supports and said bearings whereby the frame is resiliently hung upon the rear axle. The structure described relating to the means for mounting the rear axle on the frame is claimed in applicant's copending application, Serial Number 806,439. The frame may be of any suitable construction within the scope of the invention and is adapted to be carried by supporting wheels such as 7 and traction wheels such as 6.

To the forward end of the frame a pillar or casing such as B is secured in which the single piece axle C is supported as will be hereinafter described. The pillar is hollow and in shape resembles a channel member disposed transversely to the frame having two parallel sides 8 and 9 spaced apart by the web 10 to which said sides are secured. The frame A which as illustrated has a pair of channel side bars 11 and 11', the forward ends of which are fastened to the side 8 of the pillar substantially midway between its upper and lower ends by means of brackets 12. The lower end of the pillar is additionally supported as by a brace 13, which is fastened to the side bars 11 and 11' of the frame and formed on its forward lower end with a bolt 14 secured through the sides 8 and 9, and a stay collar 15 by means of the nut 16, said stay collar and bolt also assisting in holding the sides of the pillar rigidly spaced apart. The axle C is formed with flat sides which are adapted to be guided vertically in the pillar by pairs of oppositely disposed ribs 17 and 18 which are formed on the inner adjacent faces of the sides 8 and 9, said ribs extending up and down in the pillar. The ribs 17 and 18 are formed by strips. The strips 18, sides 8 and 9 and the channel member 10 are secured together by rivets or bolts 19, it being obvious that said parts may be formed of a single piece of material when desired. The central portion of the pillar has a vertical passage forming a cup 20 produced by the adjacent edges of the ribs 18, the inner faces of the side walls 8 and 9, lying between said ribs and an opening 21 in the web member 10. In this cup or vertical passage a yoke or holder 22 is placed having a channel 23 admitting the middle portion of the axle C. Passing through the sides of said yoke and the middle portion of the axle is a pivot 24 disposed longitudinally of the frame A and permitting the axle to rock in a vertical plane while its end portions are guided by the ribs 17 and 18 between the sides 8 and 9 of the pillar. The upper end of the cup 20 is formed by a cap 25 detachably secured to the web member 10 of the pillar by bolts 26 and placed within the cup between the cap and the top of the yoke 2, is a coiled expansion spring 27 which serves to resiliently support the load of the forward end of the frame and pillar upon the yoke and axle, thus permitting the axle to move and vibrate vertically. The cup opening 21 in the web member 10 is of greater size than the diameter of the opening in the cap, a shoulder 28 thus being produced by the cap which is adapted to limit the upward movement of the yoke to relieve excessive strain upon the spring 27. The stay collar 15 on the bolt 14 also acts as a stop across the lower end of the cup to hold the axle in the pillar and limit the upward movement of the pillar on the axle.

The outer ends of the axle are of usual construction and mounted upon the wheels in the usual manner to permit the wheels being steered to guide the vehicle. As illustrated each of the opposite ends of the axle is formed with a forked end 29 and each of the wheels 7 is mounted upon a spindle 30, said spindle being formed with a bracket 31, which is secured to a forked end of the axle by a pin 32. Thus each tractor wheel is free to revolve on its spindle and to swivel horizontally upon a pin permitting the wheel as it revolves to be guided. Each of the brackets is formed with or carries a laterally projecting arm 33, the arms of both brackets being pivotally connected by the connecting rod 34, so that the wheels are adapted to be guided in synchronism. One of the brackets 31 is formed with a steering arm 35 by which the wheels are adapted to be guided in the usual manner. As the vehicle moves over the ground, the axle is free to move or vibrate up and down and to oscillate or rock in a vertical plane in the pillar, thus compensating for any inequalities and unevenness in the surface of the road.

The term "channel" as used in the claims following is intended to define a passage of any cross sectional shape traversing substantially the width of the frame A.

In accordance with the patent statutes we have described the principles of operation of our invention together with the apparatus which we now consider to repreesnt the best embodiment thereof but we desire to have it understood that the construction shown is only illustrative and that the invention can be carried out by other means and applied to uses other than those above set forth within the scope of the following claims.

Having described our invention, what we claim as new and desire to protect by Letters Patent is:—

1. An axle mount for vehicles, comprising, in combination, a vehicle frame having a pillar mounted rigidly thereon, said pillar being formed with a laterally and upwardly extending channel having broad lateral substantially vertical inner faces spaced apart and a centrally disposed vertical passage across said channel forming a vertical guide, a yoke member slidable up and down in said passage, a single piece axle tiltingly mounted between the sides of said yoke to tilt vertically, the sides of said axle being guided vertically between the inner faces of said channel to prevent horizontal movement between said parts and a yielding support interposed between said yoke and the upper portion of said pillar, whereby the axle is free to rock vertically and a substantial support is provided to assist in preventing the axle from turning horizontally on said frame.

2. An axle mount for vehicles comprising in combination, a supporting frame, a pillar having walls secured to and forming a channel closed at its upper end and its inner vertical surfaces traversing substantially the width of said frame, said channel extending in depth above and below the horizontal plane of said frame and said walls being formed with a guiding passage extending up and down in said channel, a cap on said pillar over the upper end of said guiding passage, a yoke slidable up and down in said passage, a compression spring between said cap and yoke, a single piece axle pivoted upon said yoke to tilt up and down, said yoke having its ends freely swung between the sides of said channel and guided by said sides to prevent horizontal movement of said axle on said pillar and a brace between said frame and the lower portion of said pillar, said brace extending across the lower portion of said passage in the path of said yoke to assist in limiting the up and down movement between said yoke and said pillar.

In testimony whereof, we have signed our names to this specification, in the presence if two subscribing witnesses.

LOUIS MAYER.
LORENZ L. MAYER.
EDWIN A. BYE.

Witnesses:
 H. F. LEONARD,
 JOSEPH S. MARKA.